(12) United States Patent
Kim et al.

(10) Patent No.: US 7,946,181 B2
(45) Date of Patent: May 24, 2011

(54) SYSTEM FOR MEASURING DEFLECTION OF ROTATING SHAFT IN WIRELESS MANNER

(75) Inventors: Nag-Jeam Kim, Yongin-Si (KR);
Sang-Hoon Choi, Yongin-Si (KR);
Seong-Bong Kim, Seoul (KR);
Gyoo-Sup Park, Chuncheon-Si (KR)

(73) Assignee: Korea Plant Service & Engineering Co., Ltd., Seongnam-Si (KR)

( * ) Notice: Subject to any disclaimer, the term of this patent is extended or adjusted under 35 U.S.C. 154(b) by 218 days.

(21) Appl. No.: 12/343,927

(22) Filed: Dec. 24, 2008

(65) Prior Publication Data

US 2010/0122592 A1 May 20, 2010

(30) Foreign Application Priority Data

Nov. 20, 2008 (KR) .................. 10-2008-0115743

(51) Int. Cl.
*G01N 3/32* (2006.01)
(52) U.S. Cl. ............................................ 73/812; 73/760
(58) Field of Classification Search ............. 73/760–860
See application file for complete search history.

(56) References Cited

U.S. PATENT DOCUMENTS

| 7,256,505 | B2* | 8/2007 | Arms et al. .................. 290/1 R |
| 7,698,959 | B2* | 4/2010 | Raymond et al. .......... 73/862.08 |
| 7,770,471 | B2* | 8/2010 | Lohr et al. ............... 73/862.338 |
| 7,798,012 | B2* | 9/2010 | Rosen et al. .................... 73/781 |
| 7,800,745 | B2* | 9/2010 | Pan .............................. 356/121 |
| 2004/0193384 | A1* | 9/2004 | Edlund et al. ................. 702/138 |
| 2007/0028700 | A1* | 2/2007 | Liu et al. ........................ 73/801 |

* cited by examiner

*Primary Examiner* — Max Noori
(74) *Attorney, Agent, or Firm* — Birch, Stewart, Kolasch & Birch, LLP (57) ABSTRACT

Disclosed herein is a system for measuring the deflection of a rotating shaft in a wireless manner. The system includes a non-contact-type angle division device, a plurality of wireless contact-type displacement sensors, a plurality of wireless transmitters, a relay, and a data reader. The non-contact-type angle division device is placed on a vertical rotating shaft and measures and transmits the angle of rotation of the rotating shaft. The wireless contact-type displacement sensors are installed on the outer circumferential surface of the rotating shaft, and measure the strain of the rotating shaft. The wireless transmitters transmit data about the displacement of the rotating shaft measured by the wireless contact-type displacement sensor. The relay receives and relays transmission signals from the non-contact-type angle division device and the wireless transmitters. The data reader receives the transmission signals from the relay, and performs simulation reading.

4 Claims, 8 Drawing Sheets

Sensor connector

Power supply connector

Fig. 5

Serial port connector

SYSTEM FOR MEASURING DEFLECTION OF ROTATING SHAFT IN WIRELESS MANNER

BACKGROUND OF THE INVENTION

1. Field of the Invention

The present invention relates generally to a system for measuring the deflection of the rotating shaft of a rotating object, and, more particularly, to a system for measuring the deflection of a rotating shaft in a wireless manner, in which data about the deflection of the rotating shaft of the rotating object, particularly data about run-out and offset, measured through non-contact-type angle division using a wireless method is transmitted to a collection system and is then read, so that the installation and handling of the system can be facilitated and the run-out and offset of a large-size rotating shaft can be accurately and easily measured.

2. Description of the Related Art

In general, rotating objects require that run-out and offset are measured to inspect the extent of the wear of the cuter circumferential surface of a rotating shaft and the true roundness of the rotating shaft.

In particular, in order to inspect the extent of the wear of the outer circumferential surface and true roundness of a rotating shaft part that is used in an airplane engine or a power plant in the disassembly or inspection of precise aviation equipment or power plant equipment, the part to be inspected must be mounted onto turning equipment and then inspected using the turning equipment, or separate dedicated measurement equipment must be used.

Although a contact-type division device has been adopted and used to measurer the run-out and offset of a rotating shaft, this method has a defect in that slippage occurs during angle division, and thus accurate angle division is not achieved, with the result that error occurs. Meanwhile, a prior measurement method using non-contact-type displacement sensors has a defect in that great error occurs depending on the material of a measurement target object and an environment.

Furthermore, prior art angle division using a wired method and a prior art system for measuring run-out and offset have problems in that many work hours are required due to the setting work of installing sensors and data transmission lines, the range of application to parts is narrow, and the reliability of measurement cannot be achieved because noise is included in a transmitted signal value due to the long distance transmission of measured data using a plurality of transmission lines. In particular, they have a problem in that it is almost impossible to apply them to narrow areas and complicated structures.

A system for measuring the strain of a flywheel rotor, which was developed so as to overcome various types of defects and problems that occur in the prior art measurement of the run-out and offset of a rotating shaft, is disclosed in Korean Unexamined Patent Publication No. 10-2006-0003762.

The system for measuring the strain of a flywheel rotor, as shown in FIGS. 1 to 7, includes a telemetry system for transmitting strain data, measured by a strain sensor 4 attached to a flywheel system, to a remote control unit via wireless communication and measuring the strain of a flywheel rotor by processing and analyzing strain data using the monitoring software of the control unit. The telemetry system includes the strain sensor 4 for measuring strain data, a transmitter 2 for amplifying the data measured by the strain sensor 4 and transmitting the amplified data via wireless communication, a receiver for receiving wireless data from the transmitter 2, a control unit connected to the receiver and configured to process and determine transmission data, and a Personal Computer (PC) 1.

Furthermore, a flywheel rotor 3 includes the transmitter 2 of the telemetry system including a strain gauge, and an axis 2'. The transmitter 2 includes a Printed Circuit Board (PCB) 7 including a Wheatstone bridge circuit 10 required for the strain gauge sensor, an operational amplifier 11 for amplifying the analog signals of the Wheatstone bridge circuit 10, a MicroController Unit (MCU) 13 implemented using a single chip in which peripheral devices, including an analog-digital converter for converting the amplified analog signals of the operational amplifier 11 into digital signals, a microprocessor for processing the digital signals of the analog-digital converter and controlling external devices, memory, an input/output interface and a timer, are integrated together, a multiplexer 12 for handling multi-channel input, an Radio Frequency (RF) reception module 14 for transmitting data to a remote location, and a transmitting antenna 15; cylinder-type upper casing 5 and lower casing 6 fastened to each other by screws 10; a battery 8 for supplying power; and a rubber packing 9.

Figure 1:
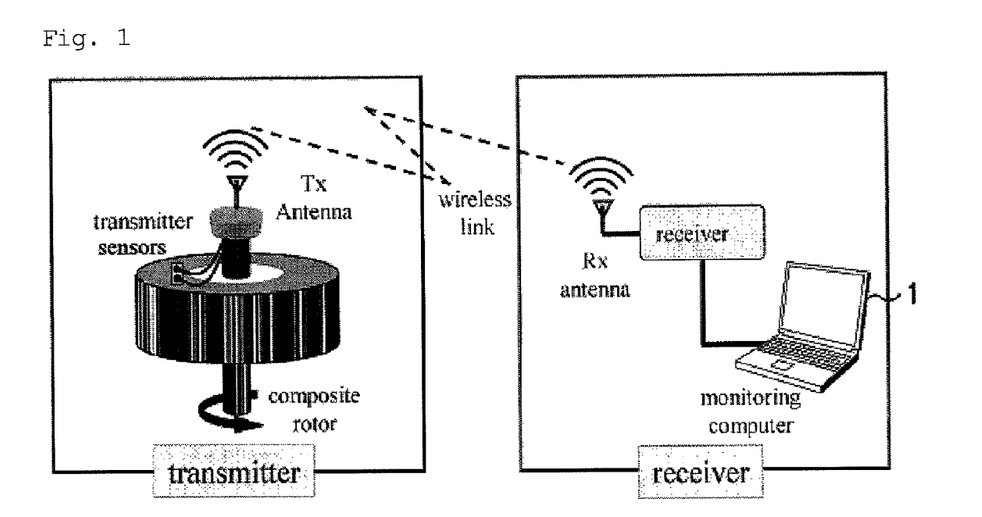
FIG. 1 is a conceptual diagram showing a prior art telemetry system applied to a flywheel rotor.
Figure 2:
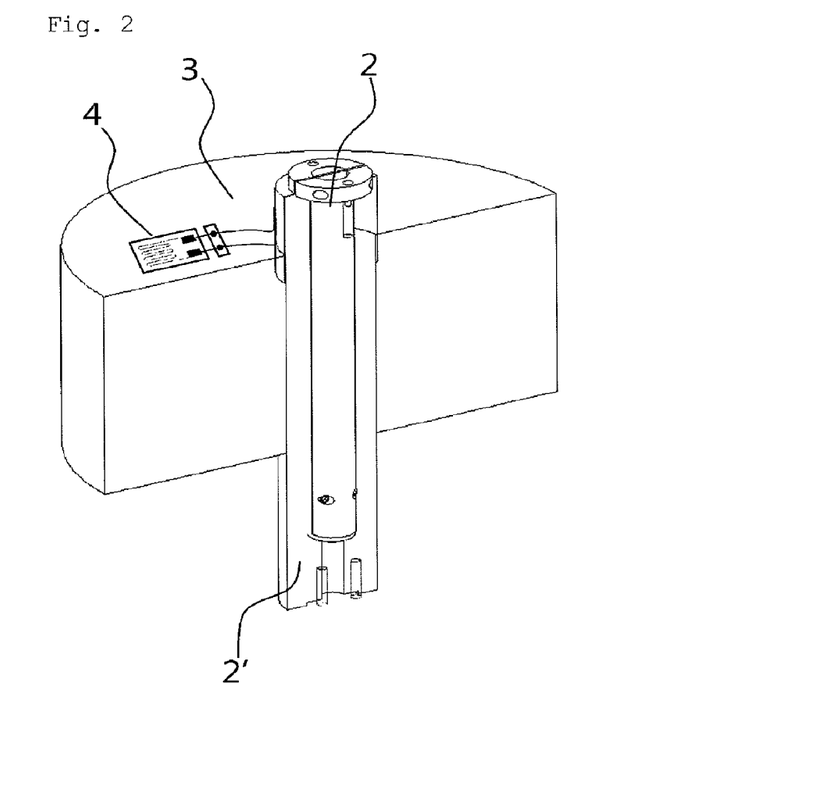
FIG. 2 is a diagram showing a prior art flywheel system.
Figure 3:
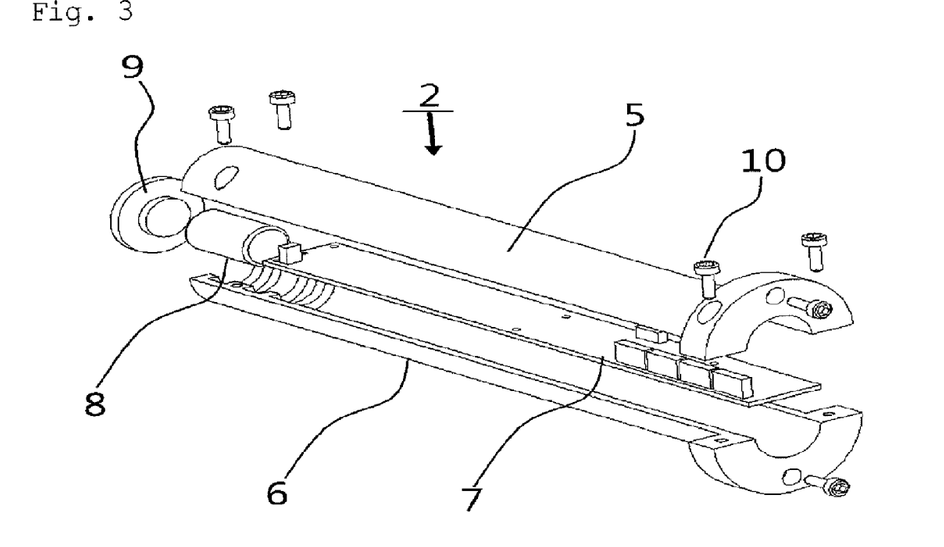
FIG. 3 is a diagram showing the transmitter of the prior art flywheel system.
Figure 4:
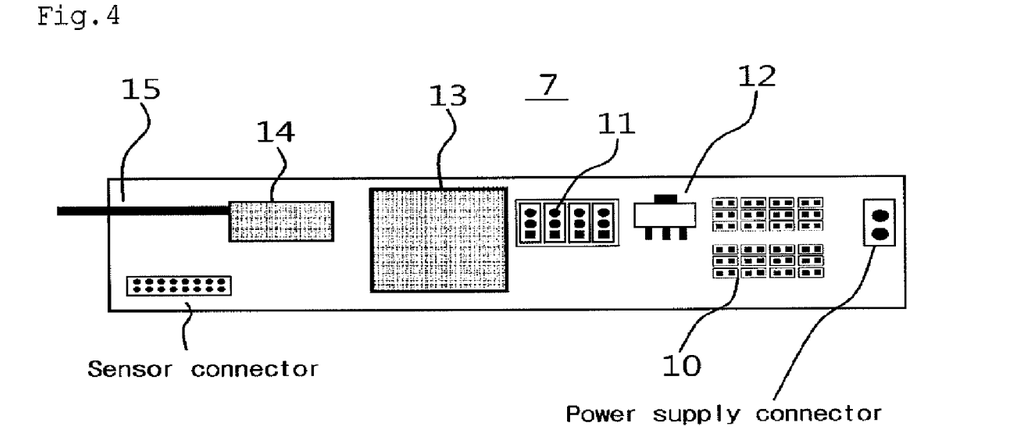
FIG. 4 is a diagram showing the construction of the transmitter PCB of the prior art flywheel system.
Figure 5:
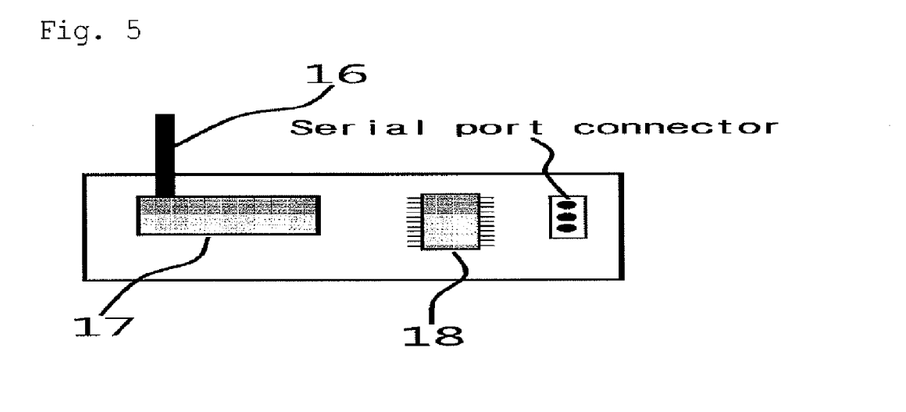
FIG. 5 is a diagram showing the construction of the receiver PCB of the prior art flywheel system.
Figure 6:
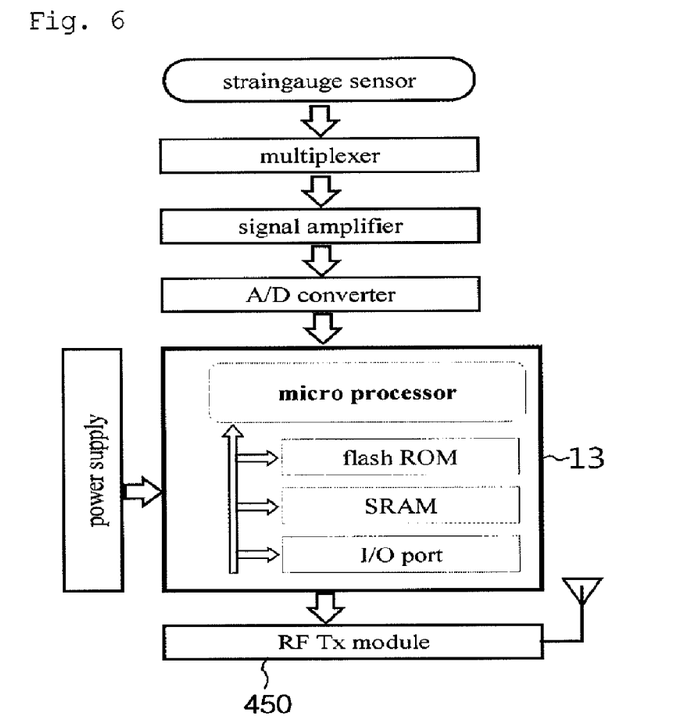
FIG. 6 is a block diagram showing the transmitter of the prior art flywheel system.
Figure 7:
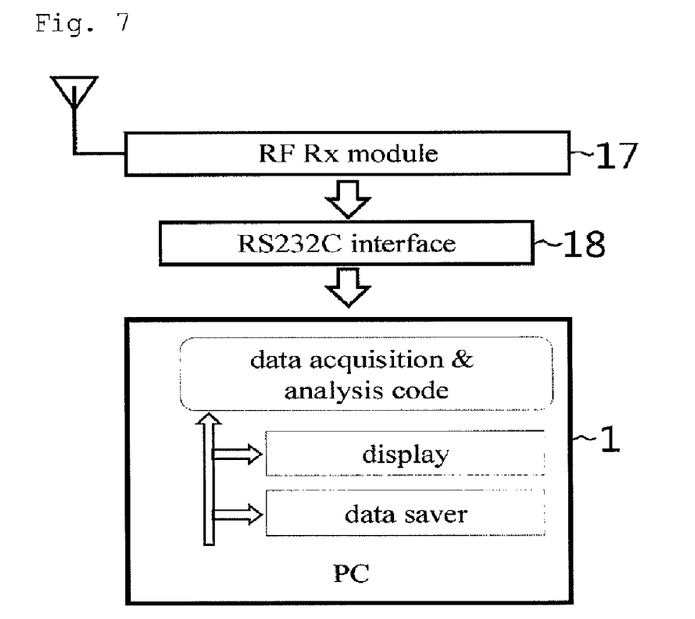
FIG. 7 is a block diagram showing the receiver of the prior art flywheel system.

The receiver includes a receiving antenna 16 and receiving communication module 17 for receiving data from the transmitter 2, and an RS232C interface module 18 for transmitting data to the control unit in a serial manner.

Accordingly, the system for measuring the strain of a flywheel rotor has advantages in that the convenience of data collection can be improved, trouble shooting can be simply performed because the system have a structure smaller and simpler than that of a wired system, the manufacture of the system is simplified thanks to small-sized parts, and relatively inexpensive RF communication can be adopted.

However, the system for measuring the strain of a flywheel rotor has a problem in that the strain sensor 4 is of a contact type, so that slippage occurs at the time of angle division, with the result that accurate angle division cannot be performed, thereby causing the frequent occurrence of error.

SUMMARY OF THE INVENTION

Accordingly, the present invention has been made keeping in mind the above problems occurring in the prior art, and an object of the present invention is to provide a system for measuring the deflection of a rotating shaft in a wireless manner, in which angle division and measurement are performed in a non-contact manner, so that the run-out and offset of a rotating shaft are measured without the occurrence of slippage or error at the time of angle division, thereby enabling highly reliable measurement.

Another object of the present invention is to provide a system for measuring the deflection of a rotating shaft in a wireless manner, in which measured values are transmitted and processed in a wireless manner, so that the system can be simplified, has high mobility, and can be installed in a short time thanks to the easiness of the installation thereof.

Still another object of the present invention is to provide a system for measuring the deflection of a rotating shaft in a wireless manner, in which wireless contact-type displacement sensors are employed, so that there is no influence attributable to the material of a measurement target object and an environment, thereby acquiring accurate measured values.

Still another object of the present invention is to provide a system for measuring the deflection of a rotating shaft in a wireless manner, which enables a reduction in the exposure of a worker to radiation when the system is used for the alignment of the rotation shaft of a nuclear power plant.

In order to accomplish the above objects, the present invention provides a system for measuring the deflection of a rotating shaft in a wireless manner, comprising a non-contact-type angle division device placed on a vertical rotating shaft and configured to measure and transmit the angle of rotation of the rotating shaft; a plurality of wireless contact-type displacement sensors installed on the outer circumferential surface of the rotating shaft and configured to measure the strain of the rotating shaft; a plurality of wireless transmitters for transmitting data about the displacement of the rotating shaft measured by the wireless contact-type displacement sensor; a relay for receiving and relaying transmission signals from the non-contact-type angle division device and the wireless transmitters; and a data reader for receiving the transmission signals from the relay and performing simulation reading.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

A system for wirelessly measuring the deflection of a rotating shaft in a wireless manner according to the present invention will be described in detail below with reference to the accompanying drawings and preferred embodiments.

Figure 8:
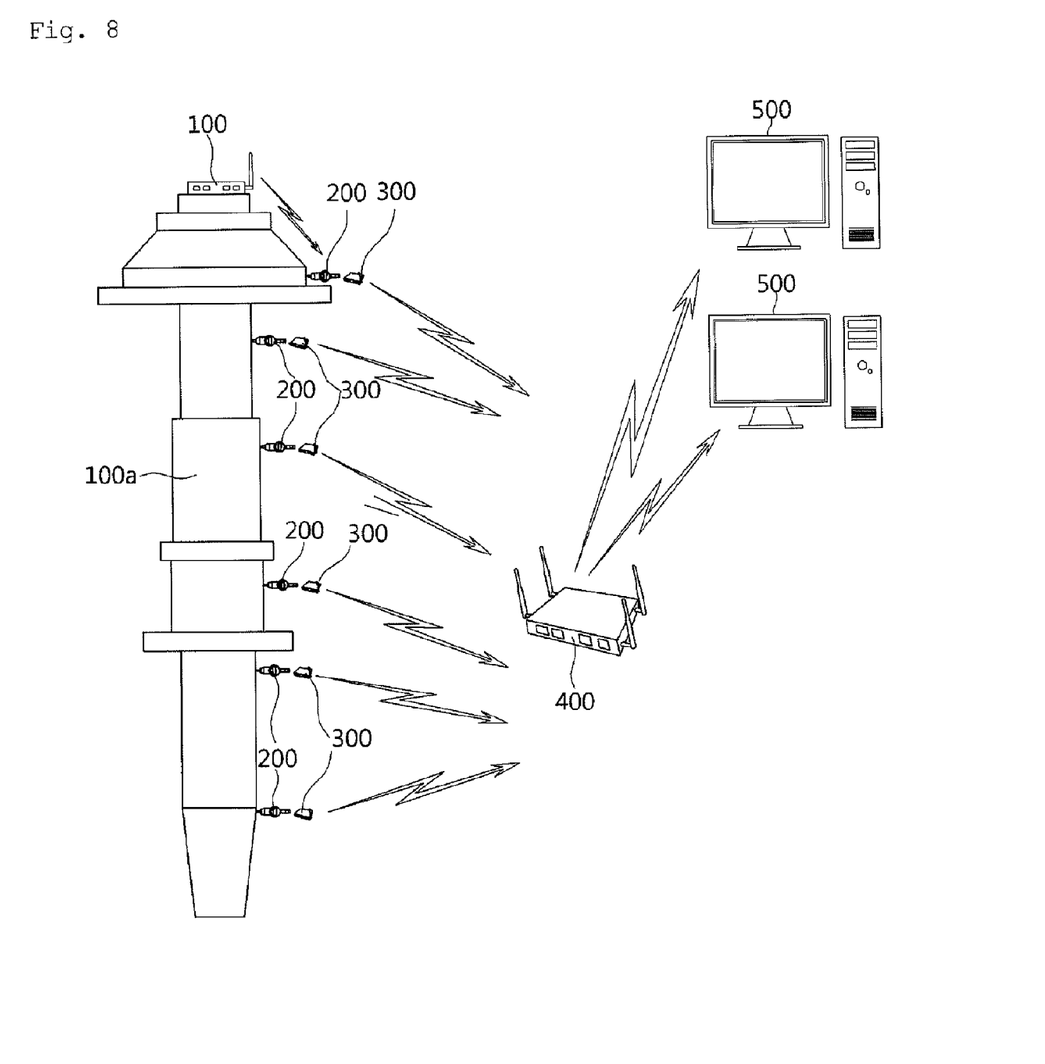
FIG. 8 is a conceptual diagram showing a system for measuring the deflection of a rotating shaft in a wireless manner according to the present invention.
Figure 9:
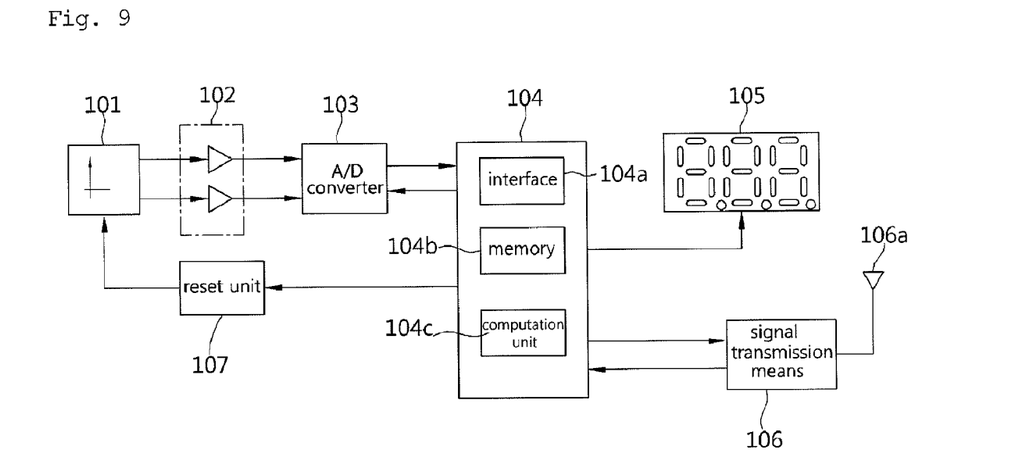
FIG. 9 is a block diagram showing a non-contact-type angle division device according to the present invention.
Figure 10:
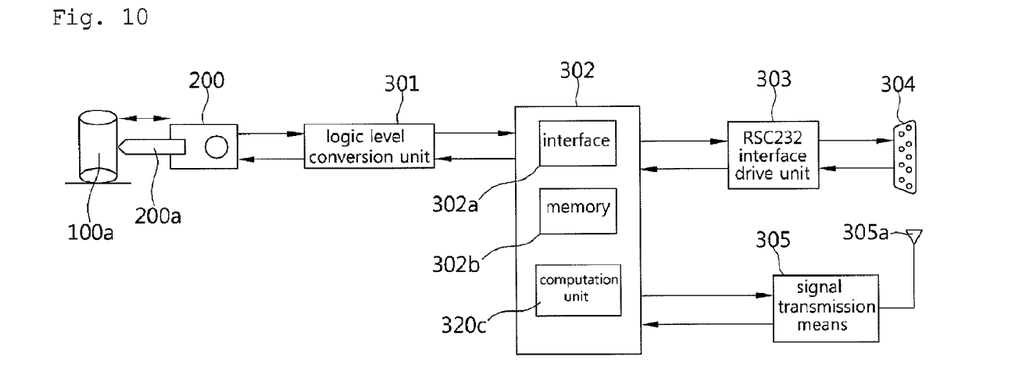
FIG. 10 is a block diagram showing a wireless contact-type displacement sensor according to the present invention.
Figure 11:
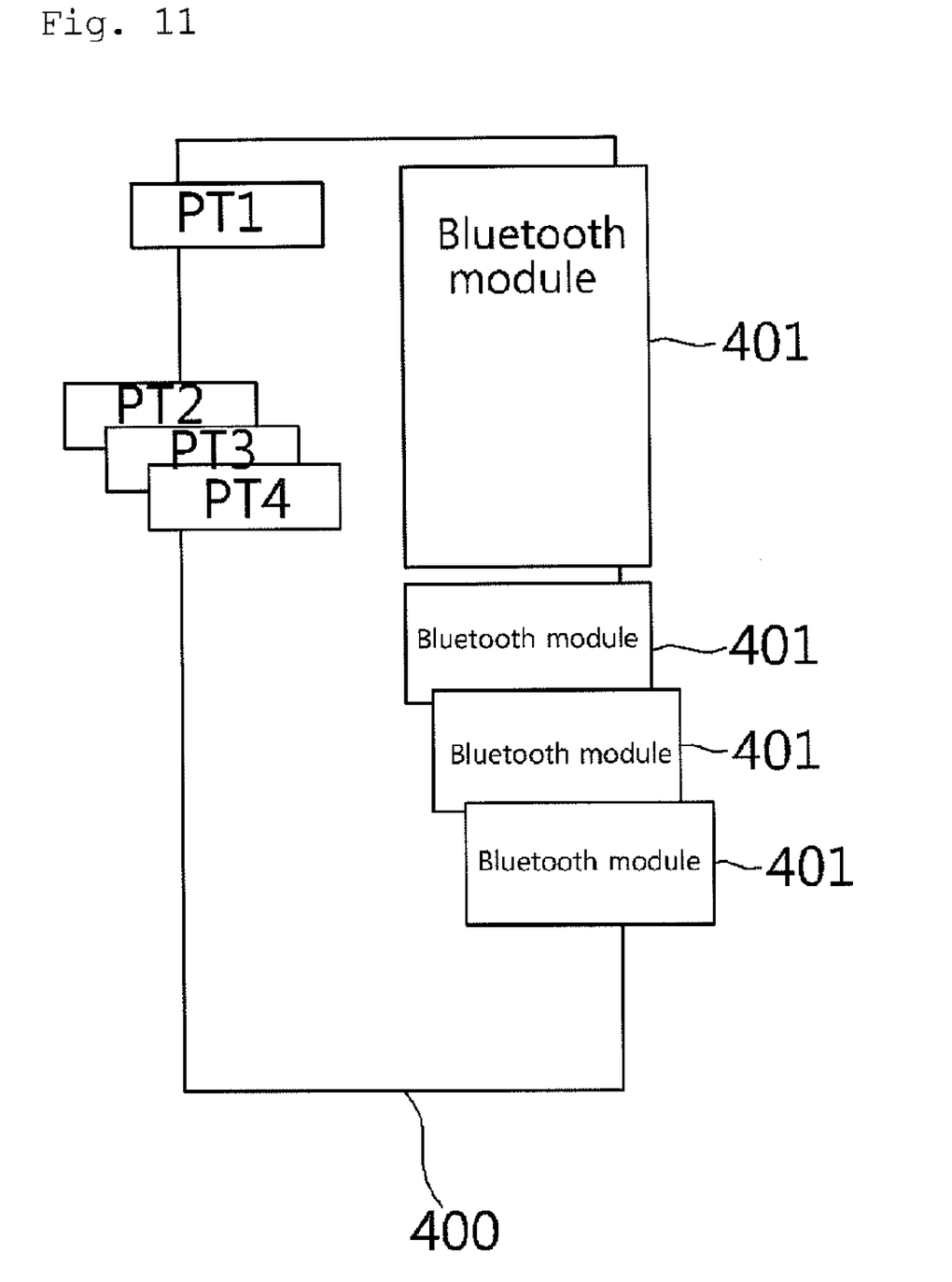
FIG. 11 is a block diagram showing a relay according to the present invention.
Figure 12:
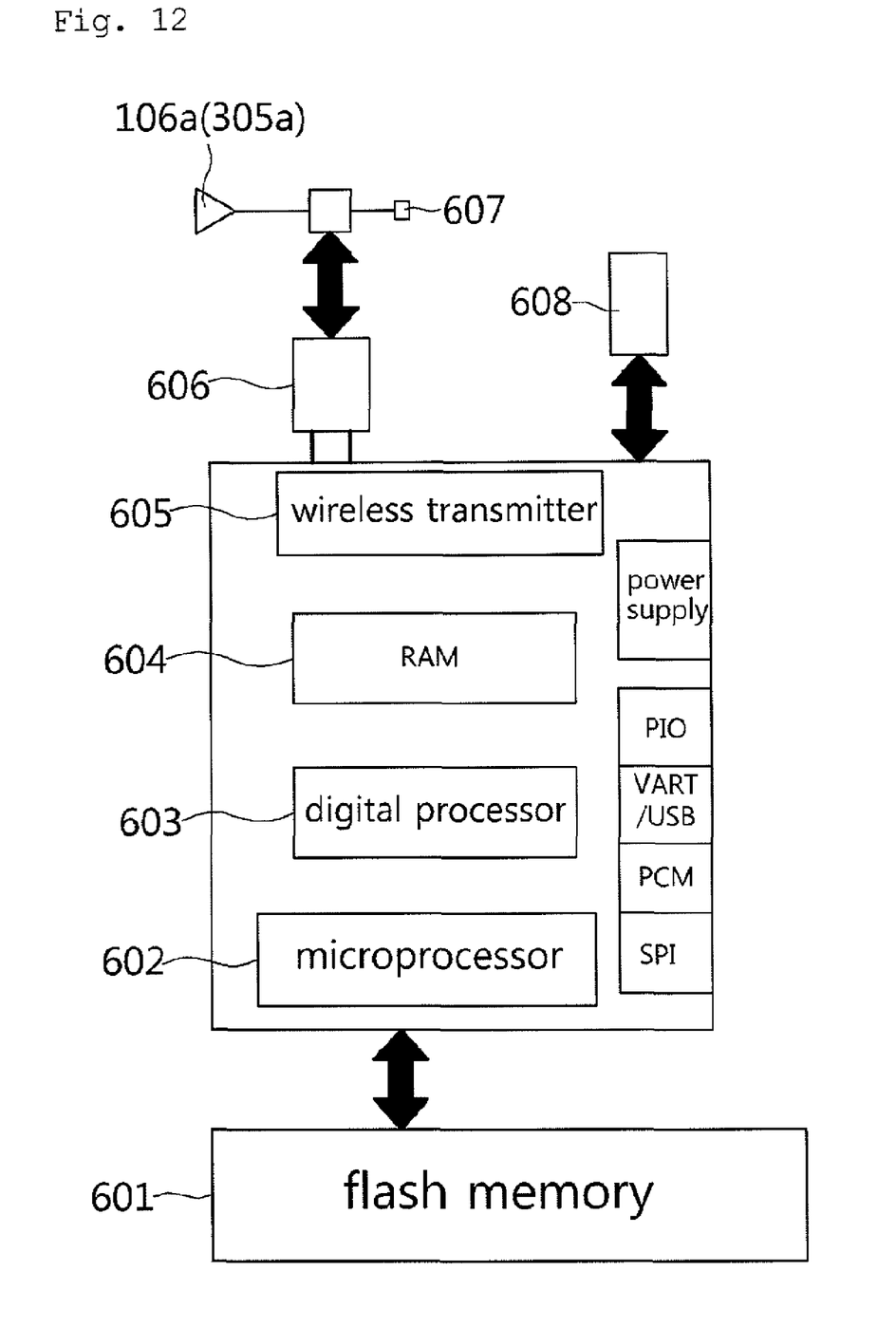
FIG. 12 is a block diagram showing signal transmission means according to the present invention.
Figure 13:
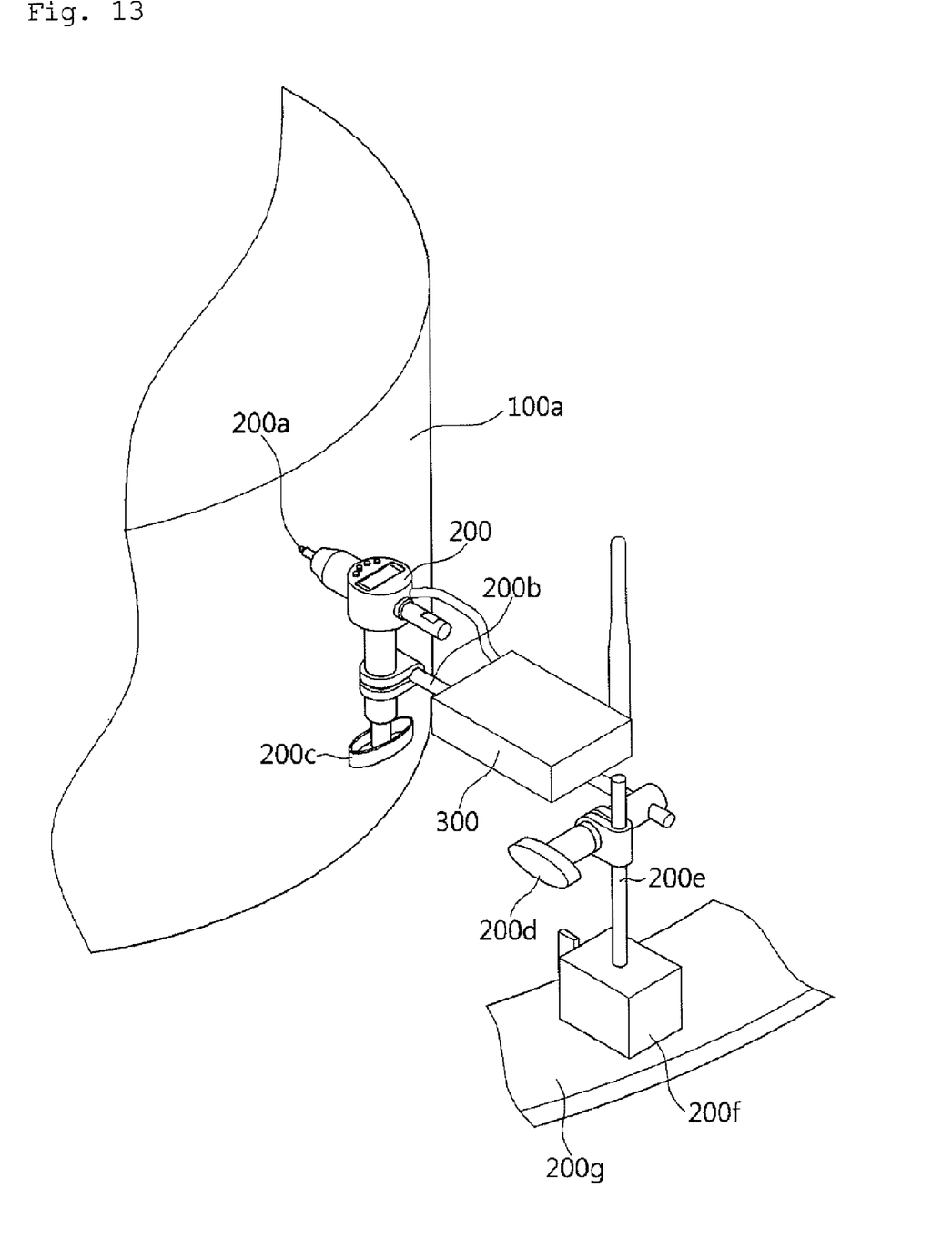
FIG. 13 is a diagram showing the installation of the wireless contact-type displacement sensor and the wireless transmitter according to the present invention.

FIG. 8 is a conceptual diagram showing a system for measuring the deflection of a rotating shaft in a wireless manner according to the present invention, FIG. 9 is a block diagram showing a non-contact-type angle division device according to the present invention, FIG. 10 is a block diagram showing a wireless contact-type displacement sensor according to the present invention, FIG. 11 is a block diagram showing a relay according to the present invention, FIG. 12 is a block diagram showing signal transmission means according to the present invention, and FIG. 13 is a diagram showing the installation of the wireless contact-type displacement sensor and the wireless transmitter according to the present invention.

The system for measuring the deflection of a rotating shaft in a wireless manner according to the present invention includes a non-contact-type angle division device 100 placed on a vertical rotating shaft 100a and configured to measure and transmit the angle of rotation of the rotating shaft 100a; a plurality of wireless contact-type displacement sensors 200 installed on the outer circumferential surface of the rotating shaft 100a and configured to measure the strain of the rotating shaft 100a; wireless transmitters 300 for transmitting data about the displacement of the rotating shaft 100a measured by the wireless contact-type displacement sensor 200; a relay 400 for receiving and relaying transmission signals from the non-contact-type angle division device 100 and the wireless transmitters 300; and a data reader 500 for receiving the transmission signals from the relay 400 and performing simulation reading.

The non-contact-type angle division device 100, as shown in FIG. 9, includes an 2-axis angle sensor 101 for detecting an azimuth angle in a 360-degree range by detecting the intensity of the Earth's minute magnetic field, amplification means 102 for amplifying the 2-axis output signals of the 2-axis angle sensor 101, an A/D converter 103 for converting the analog signals of the amplification means 102 into a digital signal, a microprocessor 104 for processing the signal obtained through the conversion of the A/D converter 103, an azimuth angle display unit 105 connected to the microprocessor 104 and configured to display the detected azimuth angle, signal transmission means 106 connected to the microprocessor 104 and configured to have an antenna 106a for transmitting a signal corresponding to the detected azimuth angle, and a reset unit 107 connected between the 2-axis angle sensor 101 and the microprocessor 104 and configured to reset the 2-axis angle sensor 101.

The microprocessor 104 includes an interface 104a connected to the A/D converter 103, memory 104b for storing the output signal of the A/D converter 103 input through the interface 104a, and a computation unit 104c for calculating the detection values of the 2-axis angle sensor 101 as an azimuth angle.

As shown in FIG. 13, each of the wireless contact-type displacement sensors 200 is configured to detect the displacement of the rotating shaft 100a by converting the amount of variation of a displacement pin 200a in contact with the circumferential surface of the rotating shaft 100a into an electrical signal. The wireless contact-type displacement sensors 200 is installed in such a way that it is fastened to one end of the horizontal support 200b by a lever 200c, a magnet 200f is mounted on the lower end of a vertical support 200e fastened to the other end of the horizontal support 200b by a lever 200d, and the vertical support 200b is attached to an installation support 200g around the rotating shaft 100a by the magnet 200f so that the displacement pin 200a comes into contact with the outer circumferential surface of the rotating shaft 100a.

The wireless transmitter 300, as shown in FIG. 10, includes a logic level conversion unit 301 for receiving the displacement signal from the wireless contact-type displacement sensor 200 and converting the level of the signal, a microprocessor 302 for processing the signal the level of which has been converted by the logic level conversion unit 301, an RS232 interface drive unit 303 connected to the microprocessor 302 and configured to interface the displacement signal with a PC, the RS232 communication port 304 of the PC connected to the RS232 interface drive unit 303, and signal transmission means 305 connected to the microprocessor 302 and configured to have an antenna 305a for transmitting the processed displacement signal.

The microprocessor 302 includes an interface 302a connected to the logic level conversion unit 301, memory 302b for storing the output signal of the logic level conversion unit 301 input through the interface 302a, and a computation unit 302c for calculating the detection values of the wireless contact-type displacement sensors 200 as the deflection value of the rotating shaft 100a.

Each of the signal transmission means 106 and 305, as shown in FIG. 12, includes flash memory 601, a microprocessor 602, a digital signal processor 603, Random Access Memory (RAM) 604, a wireless transmitter 605, a transformer/filter 606, an RF connector 607, a crystal oscillator 608, and a power supply 609.

In FIG. 12, reference characters SPI, PCM, UART/USB and PIO designate signal input/output ports.

Furthermore, product "Parani-MSP 1,000" manufactured by Sena Technologies, Inc. may be used as the relay 400. As shown in FIG. 11, the relay 400 includes a plurality of Bluetooth modules 401 and communication ports PT1~PT4.

A PC or a notebook computer is preferably used as the data reader 500.

Next, the operation of the above-described system for measuring the deflection of a rotating shaft in a wireless manner according to the present invention will be described in detail below.

The 2-axis angle sensor 101 of the non-contact-type angle division device 100 located on the vertical rotating shaft 100a experiences variation in resistance due to variation in the Earth's magnetic field, which is represented in the form of the output voltage of a bridge circuit. That is, an azimuth angle detected by the 2-axis angle sensor 101 is applied to the amplification means 102 in the form of output voltage, is amplified by the amplification means 102, is applied to the A/D converter 103, and is then converted into a digital signal.

The signal converted into the digital signal by the A/D converter 103, is stored in the memory 104b through the interface 104a of the microprocessor 104, is applied to the signal transmission means 106, and is wirelessly transmitted to the relay 400 through the antenna 106a of the signal transmission means 106 via Bluetooth communication.

Furthermore, the signal stored in the memory 104b is calculated as an azimuth angle by the computation unit 104c, and is then displayed through the azimuth angle display unit 105.

Meanwhile, in each of the wireless contact-type displacement sensors 200 in contact with the outer circumferential surface of the rotating shaft 100a, the amount of displacement of the displacement pin 200a, which is moved as the rotating shaft 100a rotates, is converted into an electric signal, is applied to the logic level conversion unit 301, is level-converted by the logic level conversion unit 301, and is stored in the memory 302b through the interface 302a of the microprocessor 302 and, at the same time, applied to the signal transmission means 305. The displacement signal is wirelessly transmitted to the relay 400 through the antenna 305a of the signal transmission means 305 via Bluetooth communication.

Meanwhile, the signal stored in the memory 302b is calculated as a deflection value of the rotating shaft 100a by the computation unit 302c, is applied to the PC through the RS232 interface drive unit 303 and the RS232 communication port 304, and is then read by the PC.

The signal corresponding to the azimuth angle detected by the 2-axis angle sensor 101 of the non-contact-type angle division device 100 and the displacement signals detected by the respective wireless contact-type displacement sensors 200, which have been wirelessly transmitted to the relay 400 via Bluetooth communication, are transmitted to the data reader 500 through the relevant communication ports PT1~PT4 of the relay 400, and are read through simulation by executing a simulation program stored in the data reader 500, so that the deflection of the rotating shaft 100a, that is, the results of the measurement of the run-out and offset of the rotating shaft 100a, is read.

According to the present invention, angle division and measurement are performed in a non-contact manner, so that the run-out and offset of a rotating shaft are measured without the occurrence of slippage or error at the time of angle division, thereby enabling highly reliable measurement. Furthermore, measured values are transmitted and processed in a wireless manner, so that the system can be simplified, has high mobility, and can be installed in a short time thanks to the easiness of the installation thereof. Furthermore, wireless contact-type displacement sensors are employed, so that there is no influence attributable to the material of a measurement target object and an environment, thereby acquiring accurate measured values. Moreover, when the system is used for the alignment of the rotation shaft of a nuclear power plant, a reduction in the exposure of a worker to radiation can be expected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for measuring deflection of a rotating shaft in a wireless manner, comprising:

a non-contact-type angle division device placed on a vertical rotating shaft and configured to measure and transmit an angle of rotation of the rotating shaft;

a plurality of wireless contact-type displacement sensors installed on an outer circumferential surface of the rotating shaft and configured to measure strain of the rotating shaft;

a plurality of wireless transmitters for transmitting data about displacement of the rotating shaft measured by the wireless contact-type displacement sensor;

a relay for receiving and relaying transmission signals from the non-contact-type angle division device and the wireless transmitters; and a data reader for receiving the transmission signals from the relay and performing simulation reading, wherein the non-contact-type angle division device comprises a 2-axis angle sensor for detecting an azimuth angle in a 360-degree range by detecting intensity of Earth's minute magnetic field, amplification means for amplifying 2-axis output signals of the 2-axis angle sensor, an Analog to Digital (A/D) converter for converting the amplified analog signals of the amplification means into a digital signal, a microprocessor for processing the signal obtained through the conversion of the A/D converter, an azimuth angle display unit connected to the microprocessor and configured to display the detected azimuth angle, signal transmission means connected to the microprocessor and configured to have an antenna for transmitting a signal corresponding to the detected azimuth angle, and a reset unit connected between the 2-axis angle sensor and the microprocessor and configured to reset the 2-axis angle sensor.

2. The system as set forth in claim 1, wherein the microprocessor comprises an interface connected to the A/D converter, memory for storing the output signal of the A/D converter input through the interface, and a computation unit for calculating a detection value of the 2-axis angle sensor as an azimuth angle.

3. The system as set forth in claim 1, wherein the signal transmission means comprises flash memory, a microprocessor, a digital signal processor, Random Access Memory (RAM), a wireless transmitter, a transformer/filter, a Radio Frequency (RF) connector, a crystal oscillator, and a power supply.

4. A system for measuring deflection of a rotating shaft in a wireless manner, comprising:
   a non-contact-type angle division device placed on a vertical rotating shaft and configured to measure and transmit an angle of rotation of the rotating shaft,
   a plurality of wireless contact-type displacement sensors installed on an outer circumferential surface of the rotating shaft and configured to measure strain of the rotating shaft
   a plurality of wireless transmitters for transmitting data about displacement of the rotating shaft measured by the wireless contact-type displacement sensor;
   a relay for receiving and relaying transmission signals from the non-contact-type angle division device and the wireless transmitters; and
   a data reader for receiving the transmission signals from the relay and performing simulation reading,
   wherein each of the wireless contact-type displacement sensors is configured to detect the displacement of the rotating shaft by converting the amount of variation of a displacement pin in contact with the circumferential surface of the rotating shaft into an electrical signal, and is installed in such a way that it is fastened to one end of a horizontal support by a lever, a magnet is mounted on a lower end of a vertical support fastened to a remaining end of the horizontal support by a lever, and the vertical support is attached to an installation support around the rotating shaft by the magnet so that the displacement pin comes into contact with the outer circumferential surface of the rotating shaft.

* * * * *